(12) United States Patent  
Ingles

(10) Patent No.: US 7,644,203 B2
(45) Date of Patent: Jan. 5, 2010

(54) SYSTEM FOR SUPPLYING POWER FOR PERIPHERAL DEVICES

(75) Inventor: Roger H. Ingles, North Richland Hills, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 11/611,066

(22) Filed: Dec. 14, 2006

(65) Prior Publication Data

US 2008/0143185 A1 Jun. 19, 2008

(51) Int. Cl.
*G06F 3/00* (2006.01)
(52) U.S. Cl. .............................. 710/38; 710/2; 710/300; 713/300
(58) Field of Classification Search ........................ None
See application file for complete search history.

(56) References Cited

U.S. PATENT DOCUMENTS

| | | | |
|---|---|---|---|
| 5,799,196 A | 8/1998 | Flannery | |
| 6,633,932 B1 | 10/2003 | Bork et al. | |
| 6,671,814 B1 | 12/2003 | Kubo et al. | |
| 6,881,098 B2 | 4/2005 | Jeansonne et al. | |
| 6,904,488 B2 | 6/2005 | Matsumoto et al. | |
| 6,915,419 B2 | 7/2005 | Chiu et al. | |
| 6,916,299 B2 | 7/2005 | Fang | |
| 6,996,727 B1 | 2/2006 | Snyder et al. | |
| 7,017,055 B1* | 3/2006 | Ho | 713/300 |
| 7,064,964 B2 | 6/2006 | Peng | |
| 2004/0103223 A1 | 5/2004 | Gabehart et al. | |
| 2005/0020144 A1 | 1/2005 | Lunecki et al. | |
| 2005/0162017 A1* | 7/2005 | Chin et al. | 307/44 |
| 2006/0095641 A1 | 5/2006 | Pandit et al. | |

FOREIGN PATENT DOCUMENTS

| | | |
|---|---|---|
| JP | 2004127020 | 4/2004 |
| JP | 2005339067 | 12/2005 |

OTHER PUBLICATIONS

Akihabara News, Squid-like USB hub, May 24, 2006, http://web.archive.org/web/20060524202131/http://www.akihabaranews.com/en/news-11144-Squid-like+USB+hub.html.*
Moixa Energy, "New Battery Technology", http://www.moixaenergy.com/page.asp?pageid=3, Sep. 28, 2006, One page.
USBCell, "AA Batteries—2 cell pack", http://www.usbcell.com/product/1, Sep. 28, 2006, Two pages.

* cited by examiner

*Primary Examiner*—Eron J Sorrell

(57) ABSTRACT

A supplementary power supply for a peripheral device is provided. The supplementary power supply comprises a first connector, a second connector, a power source, and a path. The first connector is operable to couple to a host device. The second connector is operable to couple to the peripheral device. The power source is operable to provide electrical power to the peripheral device via the second connector. The path is operable to allow data to pass between the host device and the peripheral device. A method for providing electrical power to a peripheral device is also provided.

20 Claims, 5 Drawing Sheets

SYSTEM FOR SUPPLYING POWER FOR PERIPHERAL DEVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A universal serial bus (USB) connection has become a common mechanism for coupling electronic devices to one another. A USB cable has a capability for carrying data and for providing electrical power.

A device that provides power to another device via a USB cable can be referred to as a host device and a device that receives power from another device via a USB cable can be referred to as a peripheral device. For example, a computer might have one or more USB ports to which one or more external devices, such as printers, scanners, mice, joysticks, web cams, modems, speakers, telephones, portable disk drives, and other devices, may be connected via a USB cable. If the computer supplied power to one of the external devices, the computer would be considered a host device and the external device would be considered a peripheral device. In another example, a digital music player might connect to a portable disk drive through a USB cable. If the digital music player provided power to the portable disk drive, the digital music player would be considered a host device and the portable disk drive would be considered a peripheral device. As used herein, the terms 'host' and 'peripheral' refer only to the provision of power from one device to another and do not imply any other relationship between devices.

SUMMARY

In one embodiment, a supplementary power supply is provided. The supplementary power supply comprises a first connector, a second connector, a power source, and a path. The first connector is operable to couple to a host device. The second connector is operable to couple to a peripheral device. The power source is operable to provide electrical power to the peripheral device via the second connector. The path is operable to allow data to pass between the host device and the peripheral device.

In another embodiment, a cable is provided. The cable comprises a first portion cable, a second portion cable, a first connector, a second connector, a supplementary power supply, a first path and a second path. The first connector is on a first end of the first portion cable and is coupleable to a host device. The second connector is on a second end of the second portion cable and is coupleable to a peripheral device. The supplementary power supply is positioned between at least parts of the first and second portions of cable and is electrically coupled to the second portion to provide power to the peripheral device. The first path through the first and second portions of cable allows data to pass between the host device and the peripheral device. The second path through the first and second portions of cable allows electrical power to pass from the host device to the peripheral device.

In another embodiment, a method for providing power to a peripheral device is provided. The method comprises connecting the peripheral device to a supplementary power supply, connecting a host device to the supplementary power supply, and the supplementary power supply providing electrical power to the peripheral device. The electrical power provided by the supplementary power supply supplements electrical power provided to the peripheral device by the host device.

These and other aspects of the disclosure will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

DETAILED DESCRIPTION

Figure 1:
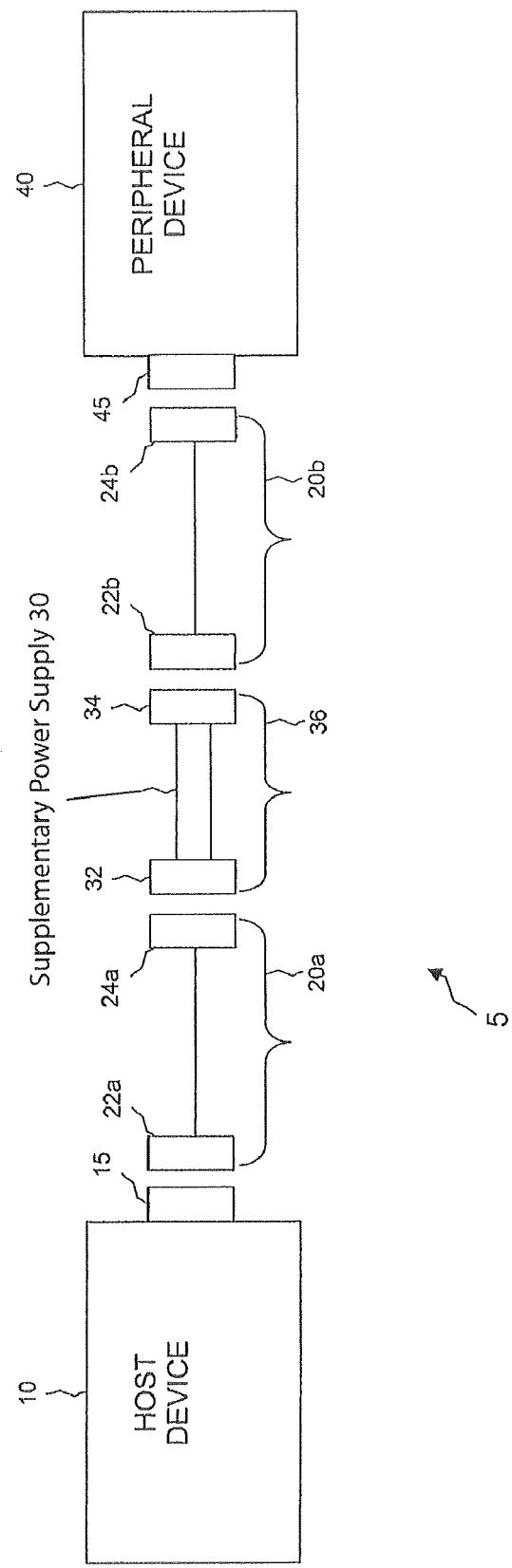
FIG. 1 illustrates a system employing a supplementary power supply in a USB connection according to an embodiment of the disclosure.

It should be understood at the outset that although an illustrative implementation of one or more embodiments of the disclosure are provided below, the systems and methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, a host device is capable of supplying, via a USB connection, all the electrical power needed by a peripheral device, but in other cases the host device may be unable to do so. For example, if the host device has limited internal battery capacity or if the peripheral device is a high-power device, such as a mass storage device that consumes a great deal of power, the host device may not be able to supply sufficient power to the peripheral device. If a host device cannot provide adequate power to a peripheral device, the peripheral device might function improperly or the host device might automatically shut down or exhibit other undesirable behavior, for example discharging a battery-based power supply within the host device too rapidly. To prevent such effects, a peripheral device might receive power from an external power supply as well as from a host device.

In an embodiment, a supplementary power supply is positioned in line with a USB cable that couples a peripheral device to a host device. The supplementary power supply might include a battery or another type of stored energy power source or power supply. The peripheral device can receive power from a combination of the power traditionally provided by the host device and the power provided by the supplementary power supply. Data lines for communication between the host device and the peripheral device are provided in any well known or commonly accomplished manner.

In an embodiment, the supplementary power supply forms an integral unit with two USB connectors such that a first separate USB cable and connector can couple the supplementary power supply to a host device and a second separate USB cable and connector can couple the supplementary power supply to a peripheral device. In another embodiment, a first USB connector is coupled to a first length of cable, which is coupled to a first end of the supplementary power supply and a second USB connector is coupled to a second length of cable, which is coupled to a second end of the supplementary power supply. Thus, the first USB connector, the first length of cable, the supplementary power supply, the second length of cable, and the second USB connector form an integral unit that can couple a host device to a peripheral device.

The supplementary power supply can prevent the power capacity of a host device from being drawn down by a peripheral device. The supplementary power supply can also prevent the power capacity of a host device from being drawn down too rapidly by a peripheral device. Also, the supplementary power supply can allow a peripheral device to operate when a host device may otherwise be incapable of meeting the power demand of the peripheral device. When the supplementary power supply is coupled to a host device, but not to a peripheral device, the host device might recharge the battery in the supplementary power supply. Also, the battery in the supplementary power supply might be recharged by an external source such as an alternating current adapter.

FIG. 1 illustrates an embodiment of a system 5 that uses a supplementary power supply 30. The supplementary power supply 30 might include a disposable battery, a rechargeable battery, or some other power source. A host device 10 is coupled to the supplementary power supply 30 by a first USB cable 20a. A peripheral device 40 is coupled to the supplementary power supply 30 by a second USB cable 20b. The peripheral device 40 might be a printer, a scanner, a mouse, a joystick, a web cam, a modem, a speaker, a telephone, or other well known devices. The peripheral device 40 might also be an external mass storage device, such as a USB travel disk, a floppy drive, an optical drive, or a hard drive, or some other high-power device. The host device 10 might be a server computer, a desktop personal computer, a portable computer, or any other device that might act as a host. Alternatively, the host device 10 might be a device that would traditionally be considered a peripheral device, but that is capable of providing power to other devices via a USB connection. For example, the host device 10 might be a digital music player that can provide power to a portable disk drive.

The host device 10 includes a standard USB connector 15 and the peripheral device 40 includes a standard USB connector 45. The USB cables 20a and 20b might be standard, commercially available cables that have appropriate USB connectors 22a, 24a, 22b, and 24b on their ends for coupling to the connector 15 on the host device 10, to the connector 45 on the peripheral device 40, and to the supplementary power supply 30. The supplementary power supply 30 includes appropriate connectors 32 and 34 for connecting to the USB cables 20a and 20b. In this embodiment, the supplementary power supply 30 and the connectors 32 and 34 form an integral unit 36. As used herein, the term 'supplementary power supply' will refer to the supplementary power supply 30 without the connectors 32 and 34 and the term 'supplementary power unit' will refer to the integral unit 36 that includes the supplementary power supply 30 and the connectors 32 and 34.

The connectors on the host device 10, the USB cables 20a and 20b, the supplementary power supply 30, and the peripheral device 40 might be any combination of Type A USB sockets or plugs, Type B USB sockets or plugs, mini-A USB sockets or plugs, mini-B USB sockets or plugs, or other sockets or plugs such that appropriate connections can be made between the host device 10, the supplementary power supply 30, and the peripheral device 40.

While it is well known in the art that type A sockets are typically used on host devices and type B sockets are typically used on peripheral devices, no such relationship or limitation between device type and connector type is implied herein. Also, different reference numbers have been given to each of the connectors in the figures described herein, but one of skill in the art will recognize that, in some cases, connectors with different reference numbers might be substantially identical to or different from one another.

Figure 2:
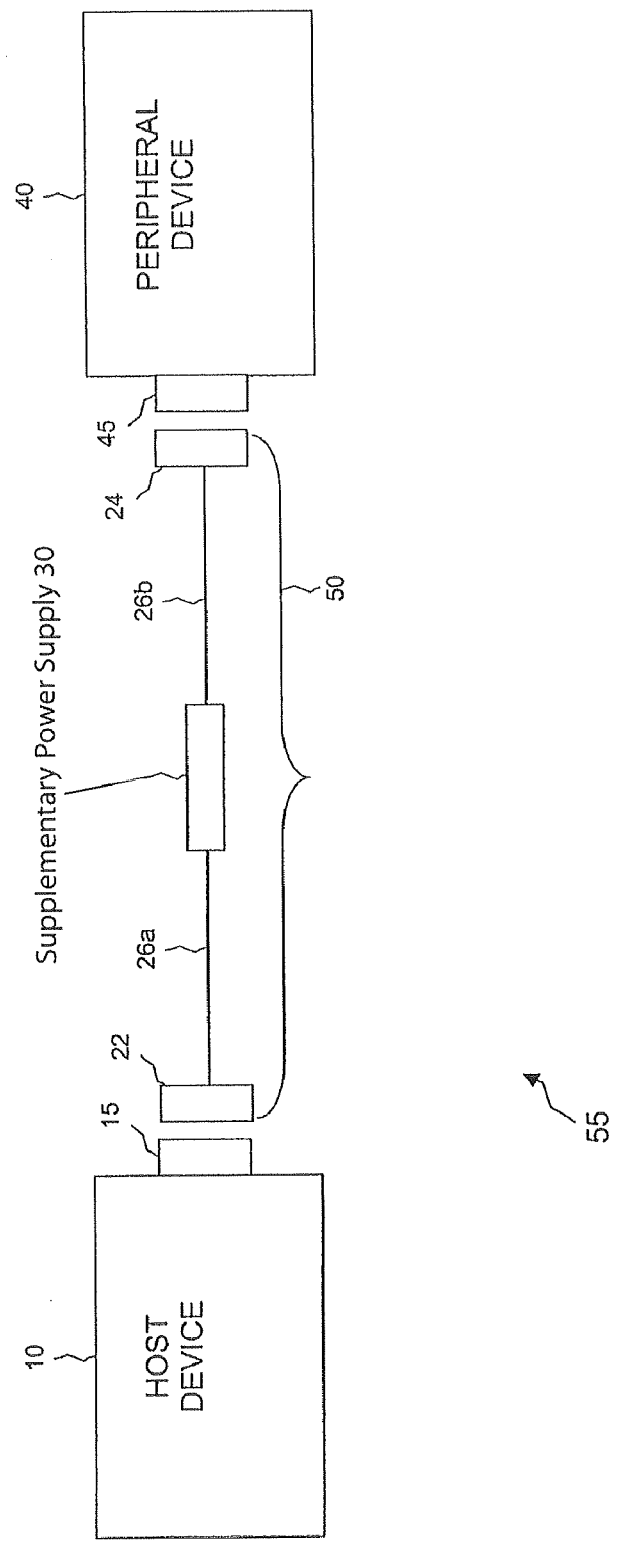
FIG. 2 illustrates another system employing a supplementary power supply in a USB connection according to an embodiment of the disclosure.

FIG. 2 illustrates an embodiment of another system 55 that uses the supplementary power supply 30. In this case, one end of a first length of USB cable 26a is coupled to the supplementary power supply 30 and the other end of the first length of USB cable 26a is coupled to the connector 22. Similarly, one end of a second length of USB cable 26b is coupled to the supplementary power supply 30 and the other end of the second length of USB cable 26b is coupled to the connector 24. Thus, the connector 22, the first length of USB cable 26a, the supplementary power supply 30, the second length of USB cable 26b, and the connector 24 form an integral unit 50 that allows the host device 10 and the peripheral device 40 to be coupled to one another with the supplementary power supply 30 in line with the connection. A user would not need to provide separate USB cables 20a and 20b in this case as was the case in the embodiment of FIG. 1. The supplementary power supply 30 might be provided in a housing, a battery retainer, or some other suitable apparatus well known to one of skill in the art to house a battery and couple the battery to communicate with cables 26a and 26b.

In either of the above embodiments, the supplementary power supply 30 is in line between the host device 10 and the peripheral device 40. The supplementary power supply 30 can pass data without modification between the host device 10 and the peripheral device 40. The supplementary power supply 30 can also supply electrical power to the peripheral device 40 as a supplement to the power that would traditionally be supplied by the host device 10. The supplementary power supply 30 in another embodiment may supply all of the electrical power provided to the peripheral device 40 and no electrical power may be drawn from the host device 10.

Figure 3:
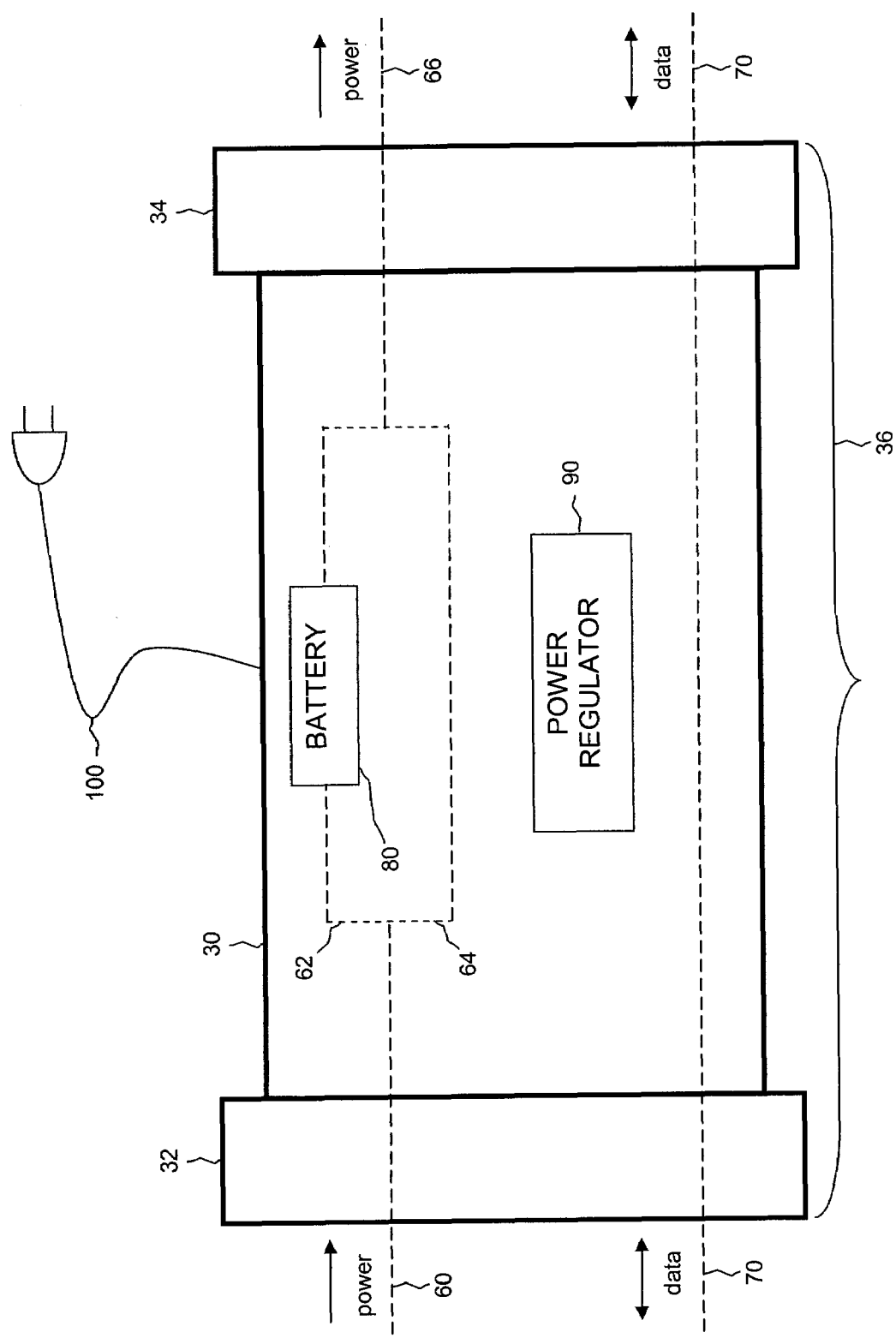
FIG. 3 illustrates a supplementary power supply according to an embodiment of the disclosure.

FIG. 3 illustrates an embodiment of the supplementary power unit 36. This embodiment is similar to that depicted in FIG. 1, where the connector 32, the supplementary power supply 30, and the connector 34 form an integral unit 36. It can be seen that data passes through the supplementary power unit 36 in an uninterrupted path 70. That is, a data pin within the connector 32 is coupled to a data pin within the connector 34 such that, when the supplementary power unit 36 is installed between the host device 10 and the peripheral device 40, data can pass without modification along path 70. A similar uninterrupted passage of data might also be provided through the integrated unit 50 of FIG. 2.

Power provided by the host device 10 can enter the supplementary power unit 36 along path 60. In an embodiment, a split can then occur into a first path 62 and a second path 64. The first path 62 passes through a battery 80 or a similar power source. The second path 64 bypasses the battery 80. One of skill in the art will recognize that path 60 and path 64 together might be similar to the path that power would typically take from the host device 10 to the peripheral device 40 if the supplementary power unit 36 were not present. After passing through the battery 80, the first path 62 rejoins the second path 64 to form a supplemented power path 66. Power to the peripheral device 40 can then be provided over the supplemented power path 66. Other paths for power through the supplementary power unit 36 and the battery 80 therein may be apparent to one of skill in the art.

The battery 80 can supplement the power that would otherwise be provided to the peripheral device 40 by the host device 10 alone or can provide power if the host device 10 provides no power. This can allow the peripheral device 40 to receive power without depleting the power supply of the host device 10. This can also allow a high-power peripheral device 40 to receive sufficient power to operate in circumstances where the host device 10 alone would not be able to provide sufficient power to the high-power peripheral device 40. In addition, when the supplementary power supply 30 is coupled to the host device 10, but not to the peripheral device 40, the host device 10 might recharge the battery 80 in the supplementary power supply 30.

The battery 80 may be of different sizes and power capacities and may consist of a plurality of batteries or other stored energy power sources. The battery 80 can be positioned in the power path 60 in such a manner that the appropriate voltage is provided on the supplemented power path 66.

In an embodiment, a power regulator 90 or similar component may be included in the supplementary power supply 30 to ensure that the combination of the power provided by the battery 80 and the power provided by the host device 10 meets the voltage requirements and other specifications for the power supplied by a USB cable. The power regulator 90 might also be able to cause the power on the supplemented power path 66 to be provided strictly by the battery 80, strictly by the host device 10, or by any combination of battery power and host device power.

In an embodiment, the supplementary power supply 30 can include a connector 100 that can connect the supplementary power supply 30 to an external power source such as an alternating current source. The external power source might provide steadier, more consistent power to supplement the power provided by the combination of the battery 80 and the host device 10. The external power source might also recharge the battery 80. The connector 100 might include or couple to an adapter to convert alternating current to direct current.

Figure 4:
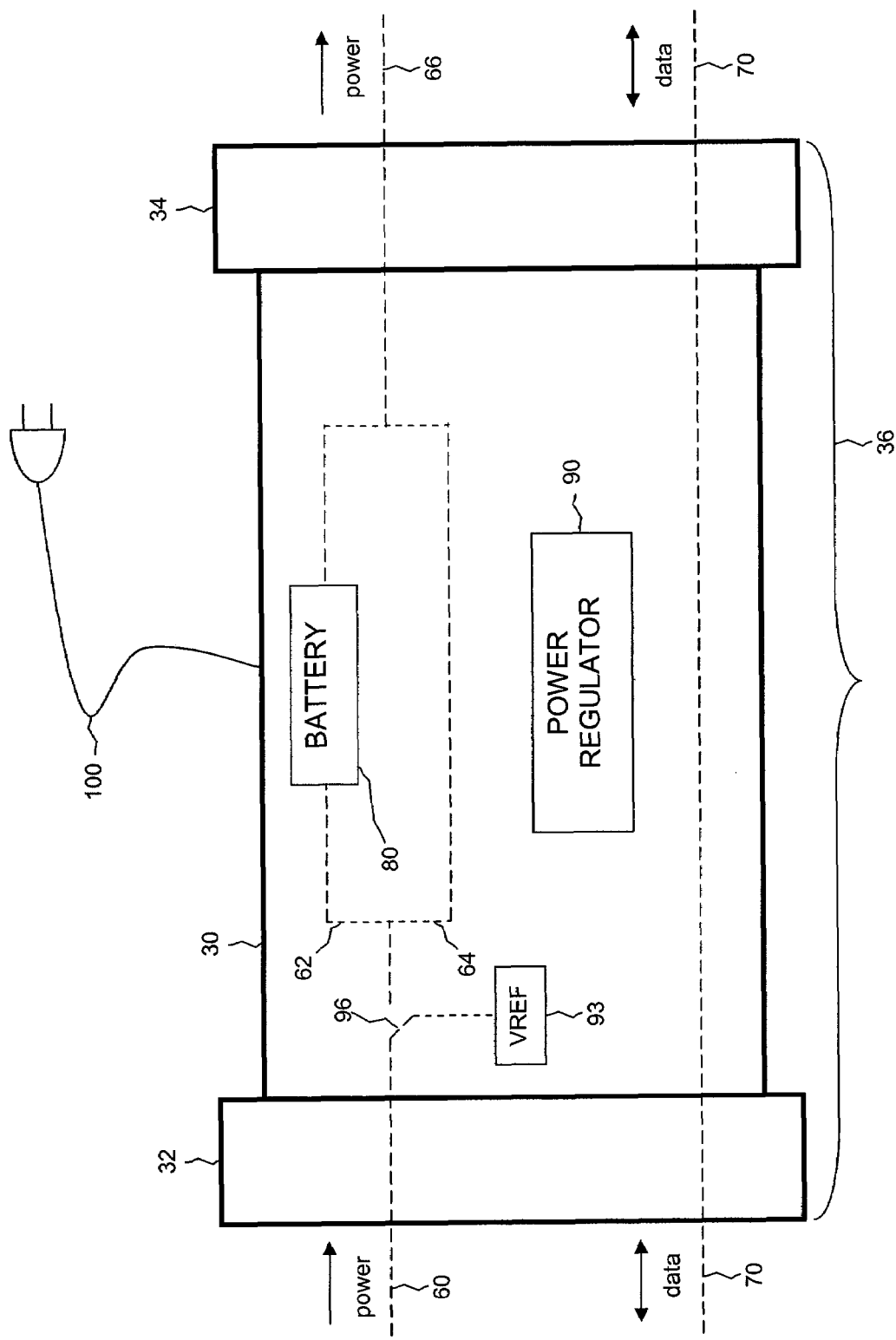
FIG. 4 illustrates a supplementary power supply according to another embodiment of the disclosure.

FIG. 4 illustrates an alternative embodiment of the supplementary power unit 36. In this embodiment, the incoming power 60 from the host device 10 is not delivered to the battery 80 or to the peripheral device 40 but, instead, terminates inside the supplementary power unit 36. The battery 80 would supply all of the power to the peripheral device 40 in this case. In an embodiment, the host voltage 60 feeds into a circuit 93 that can use the host voltage 60 as a reference voltage for the data line 70. In another embodiment, a switch 96 might be present either internally or externally to the supplementary power unit 36. The switch 96, in a first position, might allow the host voltage 60 to feed into the reference voltage circuitry 93 or otherwise terminate inside the supplementary power unit 36 and, in a second position, might allow the host voltage 60 to feed into the battery 80 as described previously.

Figure 5:
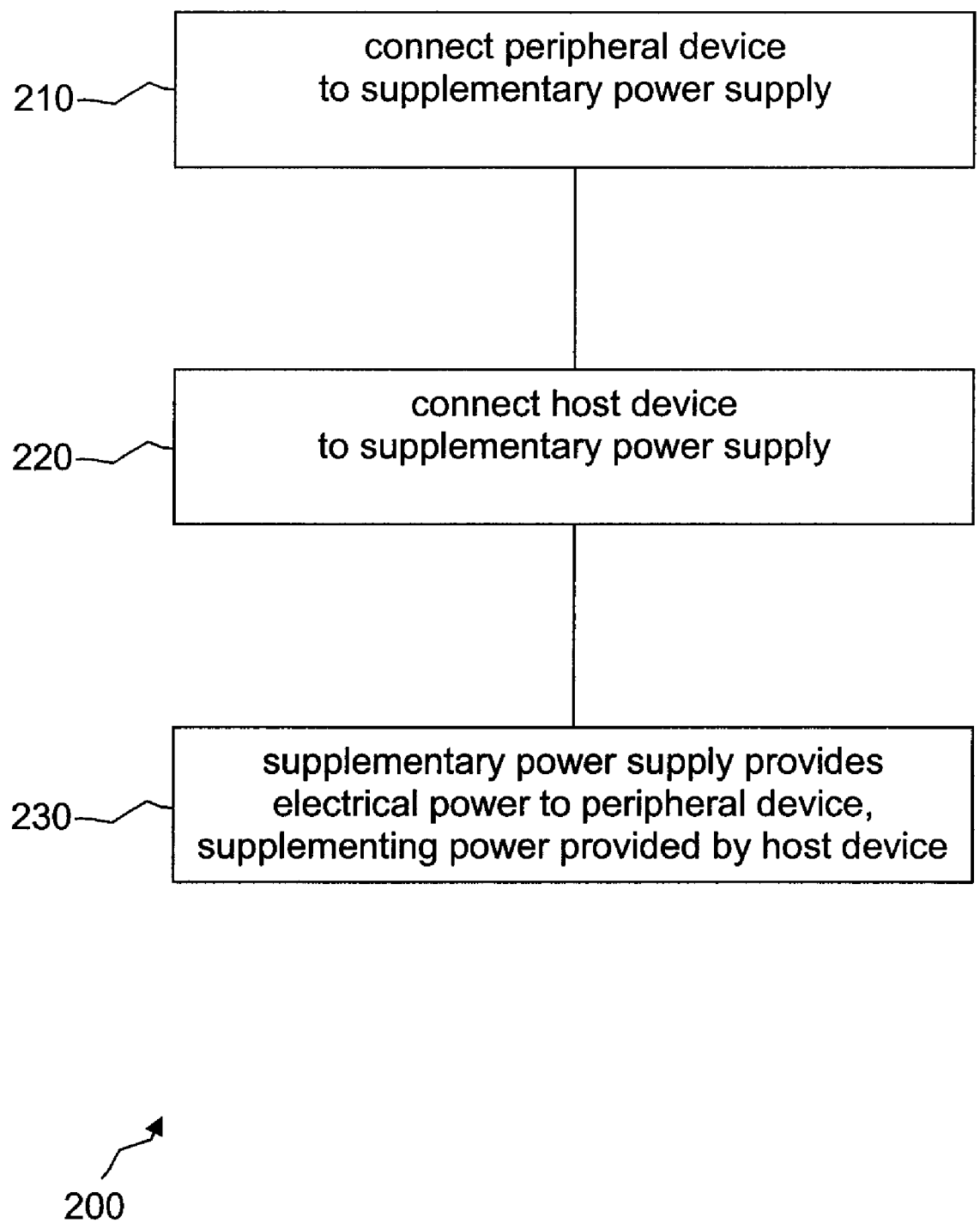
FIG. 5 illustrates a method for providing power to a peripheral device according to an embodiment of the disclosure.

FIG. 5 illustrates a method 200 for providing electrical power to a peripheral device. At block 210, a peripheral device is connected to a supplementary power supply. At block 220, a host device is connected to the supplementary power supply. At block 230, the supplementary power supply provides electrical power to the peripheral device. The power provided by the supplementary power supply may supplement or replace power provided by the host device.

While the preceding discussion has focused on USB cables, connectors, and devices, it should be understood that a supplementary power supply as described herein could also be used with other types of cables, connectors, and devices. For example, similar considerations could apply to cables, connectors, and devices that follow the Institute of Electrical and Electronics Engineers standard 1394, commonly known as the FireWire standard. The supplementary power supply could be installed on any type of cable capable of carrying data and electrical power and any such cable should be considered to be within the scope of this disclosure.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A supplementary power supply, comprising:
    a first connector configured to couple to a host device;
    a second connector configured to couple to a peripheral device;
    a first power source configured to provide electrical power to the peripheral device via the second connector;
    a path configured to allow data to pass between the host device and the peripheral device; and
    a switch configured to receive power from the host device, wherein the switch in a first position directs the power from the host device to the peripheral device, and the switch in a second position directs the power from the host device to a reference voltage circuit.

2. The supplementary power supply of claim 1, wherein the electrical power provided by the first power source supplements electrical power provided to the peripheral device by the host device.

3. The supplementary power supply of claim 1, wherein the first power source is at least one of a disposable battery and a rechargeable battery.

4. The supplementary power supply of claim 1, wherein the first connector and the second connector are Universal Serial Bus connectors.

5. The supplementary power supply of claim 1, further comprising a power regulator configured to regulate the electrical power provided to the peripheral device.

6. The supplementary power supply of claim 5, wherein the power regulator causes to be provided to the peripheral device at least one of:
- electrical power primarily from the supplementary power supply;
- electrical power primarily from the host device; and
- a combination of electrical power from the supplementary power supply and electrical power from the host device.

7. The supplementary power supply of claim 1, further comprising a third connector configured to couple the supplementary power supply to an external power source, wherein the external power source is configured to provide electrical power that supplements the electrical power provided to the peripheral device and the external power source is further configured to recharge the first power source.

8. The supplementary power supply of claim 1, further comprising:
- a first cable, a first end of the first cable coupled to the first connector and a second end of the first cable coupled to the supplementary power supply; and
- a second cable, a first end of the second cable coupled to the second connector and a second end of the second cable coupled to the supplementary power supply, the first cable and the second cable coupled to the supplementary power supply such that electrical power and data are configured to pass between the first connector and the second connector through the first cable, the supplementary power supply, and the second cable.

9. A cable, comprising: a first portion cable;
a second portion cable;
a first connector on a first end of the first portion cable, the first connector coupleable to a host device;
a second connector on a second end of the second portion cable, the second connector coupleable to a peripheral device;
a supplementary power supply positioned between at least parts of the first and second portions of cable, the supplementary power supply electrically coupled to the second portion to provide power to the peripheral device;
a first path through the first and second portions of cable to allow data to pass between the host device and the peripheral device; and
a second path through the first and second portions of cable to allow electrical power to pass from the host device to the peripheral device,
wherein the supplementary power supply comprises a switch configured to receive power from the host device, wherein the switch in a first position directs the power from the host device to the peripheral device, and the switch in a second position directs the power from the host device to a reference voltage circuit.

10. The cable of claim 9, wherein the electrical power provided by the supplementary power supply supplements the electrical power provided to the peripheral device by the host device.

11. The cable of claim 9, wherein the supplementary power supply includes a battery operable to provide electrical power to the peripheral device.

12. The cable of claim 9, wherein the first connector and the second connector are Universal Serial Bus connectors.

13. The cable of claim 9, further comprising a power regulator within the supplementary power supply configured to regulate the electrical power provided to the peripheral device.

14. The cable of claim 9, further comprising a third connector on the supplementary power supply configured to couple the supplementary power supply to an external power source, wherein the external power source is configured to provide electrical power that supplements the electrical power provided to the peripheral device and the external power source is further configured to recharge the supplementary power supply.

15. A method for providing electrical power to a peripheral device, comprising:
- connecting the peripheral device to a supplementary power supply;
- connecting a host device to the supplementary power supply;
- operating a switch configured to receive power from the host device, wherein the switch in a first position directs the power from the host device to the peripheral device, and the switch in a second position directs the power from the host device to a reference voltage circuit; and
- providing electrical power from the supplementary power supply to the peripheral device, the electrical power provided by the supplementary power supply supplementing electrical power provided to the peripheral device by the host device.

16. The method of claim 15, further comprising passing data between the host device and the peripheral device through the supplementary power supply.

17. The method of claim 15, further comprising providing electrical power from a battery in the supplementary power supply to the peripheral device.

18. The method of claim 15, wherein the connection of the peripheral device and the connection of the host device are accomplished using standard Universal Serial Bus connectors.

19. The method of claim 15, further comprising operating a power regulator within the supplementary power supply to regulate the electrical power provided to the peripheral device.

20. The method of claim 15, further comprising connecting a third connector on the supplementary power supply to an external power source, the external power source supplementing the electrical power provided to the peripheral device by the supplementary power supply, and the external power source recharging the supplementary power supply.

* * * * *

UNITED STATES PATENT AND TRADEMARK OFFICE
CERTIFICATE OF CORRECTION

PATENT NO.        : 7,644,203 B2                                         Page 1 of 1
APPLICATION NO.   : 11/611066
DATED             : January 5, 2010
INVENTOR(S)       : Roger H. Ingles It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 397 days.

Signed and Sealed this

Twenty-first Day of December, 2010

David J. Kappos
*Director of the United States Patent and Trademark Office*